(12) United States Patent
Fang

(10) Patent No.: US 6,319,460 B1
(45) Date of Patent: Nov. 20, 2001

(54) METAL-MATRIX DIAMOND OR CUBIC BORON NITRIDE COMPOSITES

(75) Inventor: Zhigang Fang, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 09/636,153

(22) Filed: Aug. 10, 2000

Related U.S. Application Data

(62) Division of application No. 09/266,111, filed on Mar. 10, 1999, now Pat. No. 6,106,957.
(60) Provisional application No. 60/078,553, filed on Mar. 19, 1998.

(51) Int. Cl.[7] ....................................................... B22F 3/12
(52) U.S. Cl. .................. 419/32; 419/35; 419/48; 419/49; 419/11
(58) Field of Search .................... 419/32, 35, 48, 419/49, 64, 66, 11

(56) References Cited

U.S. PATENT DOCUMENTS

| | | | |
|---|---|---|---|
| 4,006,788 | 2/1977 | Garner | 175/330 |
| 4,151,686 | 5/1979 | Lee et al. | 51/307 |
| 4,234,048 | 11/1980 | Rowley | 175/329 |
| 4,428,906 | 1/1984 | Rozmus | 419/48 |
| 4,656,002 | 4/1987 | Lizenby et al. | 419/10 |
| 4,695,321 | 9/1987 | Akashi et al. | 75/243 |
| 4,744,943 | 5/1988 | Timm | 419/10 |
| 4,749,545 | 6/1988 | Begg et al. | 419/13 |
| 4,931,068 | 6/1990 | Dismukes et al. | 51/293 |
| 4,972,912 | 11/1990 | Keshavan | 175/329 |
| 5,096,465 | 3/1992 | Chen et al. | 51/295 |
| 5,120,495 | 6/1992 | Supan et al. | 419/11 |
| 5,130,771 | 7/1992 | Burnham et al. | 357/81 |
| 5,451,352 | 9/1995 | Cook | 264/102 |
| 5,589,268 | 12/1996 | Kelley et al. | 428/408 |
| 5,598,621 | 2/1997 | Littecke et al. | 29/412 |
| 5,676,496 | 10/1997 | Littecke et al. | 407/118 |

FOREIGN PATENT DOCUMENTS

| | | |
|---|---|---|
| 0 181 979 A1 | 5/1986 | (EP) . |
| 0 352 811 A1 | 1/1990 | (EP) . |
| 10071569 | 3/1998 | (JP) . |
| WO 92/07102 | 4/1992 | (WO) . |

OTHER PUBLICATIONS

P. Price, "Hot Isostatic Pressing of Metal Powders"; Metals Handbook Ninth Edition, vol. 7, Powder Metallurgy; pp. 419–443; 1984.

C. Kelto, "Rapid Omnidirectional Compaction"; Metals Handbook Ninth Edition, vol. 7, Powder Metallurgy; pp. 542–546; 1984.

R. Dotter, "Blending and Premixing of Metal Powders"; Metals Handbook Ninth Edition, vol. 7, Powder Metallurgy; pp. 186–189, 1984.

PCT International Search Report, Jun. 8, 1988, 2 pages.

*Primary Examiner*—Ngoclan Mai
(74) *Attorney, Agent, or Firm*—Rosenthal & Osha L.L.P.

(57) ABSTRACT

A metal-matrix diamond or cubic boron nitride composite and method of making the same are disclosed. The metal-matrix/diamond composite includes grains of diamond uniformly distributed in a metal matrix. Alternatively, grains of cubic boron nitride may be used. Suitable metals for the metal matrix material may include nickel, cobalt, iron, and mixtures or alloys thereof. Other transition metals also may be used. The metal-matrix/diamond or metal-matrix/cubic boron nitride composite has high fracture toughness due to its fine microstructure. Such a metal-matrix/diamond or metal-matrix/cubic boron nitride composite is suitable for use in blanks or cutting elements for cutting tools, drill bits, dressing tools, and wear parts. It also may be used to make wire drawing dies.

23 Claims, 2 Drawing Sheets

METAL-MATRIX DIAMOND OR CUBIC BORON NITRIDE COMPOSITES

CROSS-REFERENCE TO RELATED APPLICATIONS

This is a division of application Ser. No. 09/266,111 filed on Mar. 10, 1999 now U.S. Pat. No. 6,106,957, which application itself claims priority from provisional application No. 60/078,553 filed on Mar. 19, 1998.

FIELD OF THE INVENTION

The invention relates to wear resistant materials and more particularly to diamond-based materials for manufacturing cutting elements for use in cutting and drilling applications.

BACKGROUND OF THE INVENTION

Super-hard materials, such as diamond or cubic boron nitride (CBN), have superior wear resistance and are commonly used as cutting elements for cutting or drilling applications. In these applications, a compact of polycrystalline diamond or CBN is commonly bonded to a substrate material (e.g., cemented metal carbide) to form a cutting structure. A compact is a polycrystalline mass of super-hard particles, such as diamond or CBN, that are bonded together to form an integral, tough, coherent, and high-strength mass. The substrate material generally is selected from the group consisting of tungsten carbide, titanium carbide, tantalum carbide, and mixtures thereof. The substrate material further contains a metalbonding material selected from the group consisting of cobalt, nickel, iron, and mixtures thereof. The metal bonding material is normally 6 to 25 percent of the material by weight. Such compacts and other super-hard structures have been used as blanks for cutting tools, drill bits, dressing tools, wear parts, and rock bits. Additionally, compacts made in a cylindrical configuration have been used to make wire drawing dies.

Various methods have been developed to make polycrystalline diamond or CBN compacts. One such method involves subjecting a mass of separate crystals of the super-hard abrasive material and a catalyst metal to a high pressure and high temperature (HPHT) process which results in inter-crystal bonding between adjacent crystal grains. The diamond or CBN materials are thermodynamically stable under the pressure and temperature conditions used in HPHT. The catalyst metal may be a cemented metal carbide or carbide-molding powder. A cementing agent also may be used that acts as a catalyst or solvent for diamond or CBN crystal growth. The cementing agent generally has been selected from cobalt, nickel, and iron when diamonds are used as the super-hard abrasive material. Aluminum or an aluminum alloy generally is used as a cementing agent when CBN is used as the super-hard material. The catalyst metal preferably is mixed with the super-hard crystals (e.g., in powder form).

Although the catalyst may be mixed in powder form with the super-hard crystals, no attempt is made to minimize the formation of clusters of super-hard crystals. As a result, the compacts produced by this method commonly are characterized by diamond-to-diamond or CBN-to-CBN bonding (i.e., inter-crystal bonding between adjacent grains). This maximization of inter-crystal bonding between adjacent grains is an objective in making super-hard compacts. Typically, a diamond compact formed in the presence of cobalt contains multiple clusters of diamond grains with each cluster containing more than one (e.g., 3 to 6) diamond grains. These clusters connect with each other and form a network of diamond grains. In a typical diamond compact, diamond grain-to-grain contiguity is greater than 40%. The diamond grain-to-grain contiguity refers to the percentage of continuous diamond phase in a given direction within a diamond compact, and is indicative of the extent of diamond-diamond contact in the diamond compact. The cobalt phase typically is not a continuous matrix. Instead, pools of cobalt are distributed in the spaces formed by the diamond clusters. The average size of the cobalt pools typically is larger than the average size of the diamond grains.

With this microstructure, the compacts are extremely wear resistant, but relatively brittle. Once a crack starts, it can propagate through the compact and eventually result in failure of the part. This is particularly true in the case of petroleum or rock drill bits, in which a massive failure of the diamond layer of an insert made of a polycrystalline diamond compact can lead to damage of the other cutters on the bit or the bit body.

Additionally, diamond or CBN compacts are relatively expensive to manufacture with the high pressure/high temperature process. Further, the size of the diamond or CBN compacts is limited by the dimensions of the press cell. Typically, only a few pieces, each having a cross-section of less than 1 inch, can be processed in a press cell, while the largest piece that presently can be processed has a cross-section of less than 2 inches.

For the foregoing reasons, there exists a need for a wear-resistant material that utilizes the wear resistance of diamond or CBN materials while possessing a higher toughness than previously typical of diamond or CBN compacts. Further, it is desirable that the method of manufacturing such a composite material be capable of producing parts that are larger than 2 inches in cross-section.

SUMMARY OF THE INVENTION

In one aspect, In some aspects the invention relates to a super-hard composite material comprising: a super-hard component representing about 40%–85% of the volume of the super-hard material; a metal matrix component representing about 15%–60% of the volume of the super-hard material; and wherein the super-hard component and the metal matrix component are combined in a uniform composite mixture with an actual density at least 95% of the theoretical maximum density of the composite mixture.

In an alternative embodiment, the invention relates to a method for manufacturing a super-hard composite material comprising: providing a super-hard component representing about 40%–85% of the volume of the super-hard composite material; providing a metal matrix component representing about 15%–60% of the volume of the super-hard composite material; milling the super-hard component with the metal matrix component to achieve a uniform mixture; and compacting the uniform mixture to an actual density at least 95% of the theoretical maximum density of the mixture.

Other aspects and advantages of the invention will be apparent from the following description and the appended claims.

DETAILED DESCRIPTION OF THE INVENTION

Figure 1A:
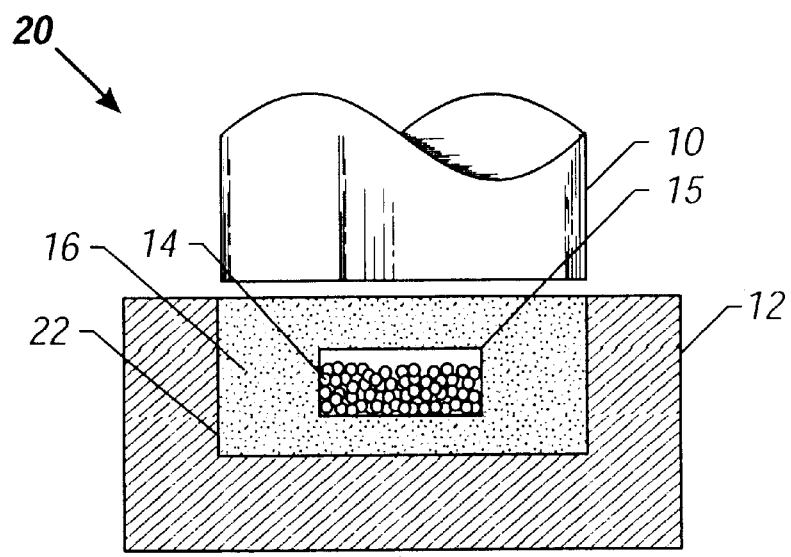
FIG. 1a shows a schematic of a typical rapid omni-directional compaction process before compaction.

Exemplary embodiments of the invention will be described with reference to the accompanying drawings. Like items in the drawings are shown with the same reference numbers.

Embodiments of the invention provide a metal-matrix/super-hard composite that exhibits a higher toughness than currently available diamond or CBN compacts while maintaining superior wear resistance. Such metal-matrix/super-hard composites contain super-hard grains that are dispersed uniformly in a metal matrix such as cobalt, nickel, iron, or alloys thereof. Suitable super-hard materials include diamond and cubic boron nitride. The microstructure of the composites is such that the composite is substantially free of large clusters of grains of the super-hard material. The grain-to-grain contiguity of the super-hard material is less than 40%, and the average size of the matrix metal pools in the composite is smaller than the average size of the grains of the super-hard material.

Although embodiments of the invention include both diamond and boron nitride as the super-hard material, metal-matrix/diamond composites are exemplified and explained in more detail than metal-matrix/CBN composites. However, it should be understood that any such descriptions are similarly applicable to metal-matrix/CBN composites.

In preferred embodiments, each diamond grain is surrounded by cobalt, which acts as a matrix. The super-hard, brittle diamond grains thus are embedded in a matrix of a relatively ductile metal. The ductile metal matrix provides the necessary toughness, while the grains of super-hard material in the matrix furnish the necessary wear resistance. The grains of super-hard material perform the cutting function while being held in place by the relatively ductile metal matrix. The ductile metal matrix also reduces crack formation and suppresses crack propagation through the composite material once a crack has been initiated. As a result of this combination of super-hard material grains surrounded by a metal matrix, these composites possess higher toughness but still maintain superior wear resistance as compared to conventional diamond or CBN compacts.

The metal-matrix/diamond or metal-matrix/CBN composites of the present invention may be manufactured by the following method: (1) milling a mixture of diamond or CBN grains and one or more metal powders to form a uniform mixture; and (2) hot-compacting the mixture to an actual density that is at least 95% of the theoretical maximum density of the mixture. It should be understood that, in a powder mixture, there typically is a certain degree of porosity. The theoretical maximum density of a mixture refers to the density of such a mixture with zero porosity.

In some embodiments, the mixture includes between 40% to 85% by volume of diamond grains and correspondingly between 15% to 60% by volume of metal matrix material. It should be recognized that it is possible to obtain a mixture that contains between 1% to 99% by volume of diamond or CBN grains according to embodiments of the invention.

The diamond grains used in the embodiments may either be natural or synthetic diamond grit. Although it is possible to use diamond grains of any size, it is preferred that the average grain size of diamond falls in the range of between 1 $\mu$m and 30 $\mu$m.

In some embodiments, the super-hard grains are coated with a metal layer before milling to prevent surface oxidation of the super-hard material during the hot-compaction process. While copper is a suitable material for such a coating, other materials, such as titanium nitride, titanium carbonitride, zirconium nitride, cobalt, tungsten, and nickel, also may be used.

Sometimes it is desirable to heat-treat the diamond grains in a hydrogen atmosphere at an elevated temperature. Typically, the temperature range is from 600° C. to 1200° C. It is believed that the hydrogen treatment step facilitates the removal of oxygen-containing species on the surface of the diamond grains. This tends to reduce the extent of oxidation of the diamond grains in the subsequent hot-compaction process. This step may be done either before or after the milling of the grains and the powder.

Suitable metal powders that may be mixed with diamond grains include nickel, iron, cobalt, and mixtures or alloys thereof. Suitable metals also may include Mo, W, Ti, Nb, Ta, V, other transitional metals, and their alloys. In a preferred embodiment, cobalt powder is used to form the metal matrix. Although the particle size of the cobalt powder may be in any range, it is preferred that the average cobalt powder particle size falls within a range between 1 $\mu$m and 30 $\mu$m.

The cobalt powder and diamond grains are milled together to form a mixture where the diamond grains are uniformly distributed in the cobalt powder. Such uniformity may be indicated by diamond grain-to-grain contiguity, although other parameters also are acceptable. Any powder milling technique that renders a uniform mixing can be used. In a preferred embodiment, attritor-milling was employed at 300 rpm for two hours to obtain a uniform mixture.

After a uniform mixture of diamond grains and cobalt powder is obtained, a cold-compacted "green" piece of a desired shape is made from the mixture. The green piece then is subjected to a hot-compaction process to achieve an actual density that is at least 95% of the theoretical maximum density. Suitable methods of hot compaction may include hot isostatic pressing, hot pressing, rapid omni-directional compaction, and a high pressure/high temperature process. Although it is preferred that a hot-compaction process be used to obtain the desired density, it should be understood that any compaction process, including cold-compaction, may be utilized. Further, it should be recognized that compaction to an actual density to less than 95% of the theoretical maximum density may be acceptable for some applications.

In a preferred embodiment, the rapid omni-directional compaction process is used to make the composites because it operates at a lower pressure than the HPHT process. Additionally, it provides excellent dimensional control. This makes it an ideal near-net shape production method with mechanical properties at least equal to or better than those produced by hot isostatic pressing. Another advantage is higher production output and lower production cost than other processes. Also, when compared to the HPHT process, the rapid omni-directional compaction process can produce substantially larger work pieces. Finally, the relatively short thermal exposure given to the powders during rapid omni-directional compaction results in retention of a very fine microstructure with excellent mechanical properties. The rapid omni-directional compaction process has been described in U.S. Pat. Nos. 4,428,906 and No. 4,656,002, and the teachings of these patents are incorporated by reference herein.

Figure 1B:
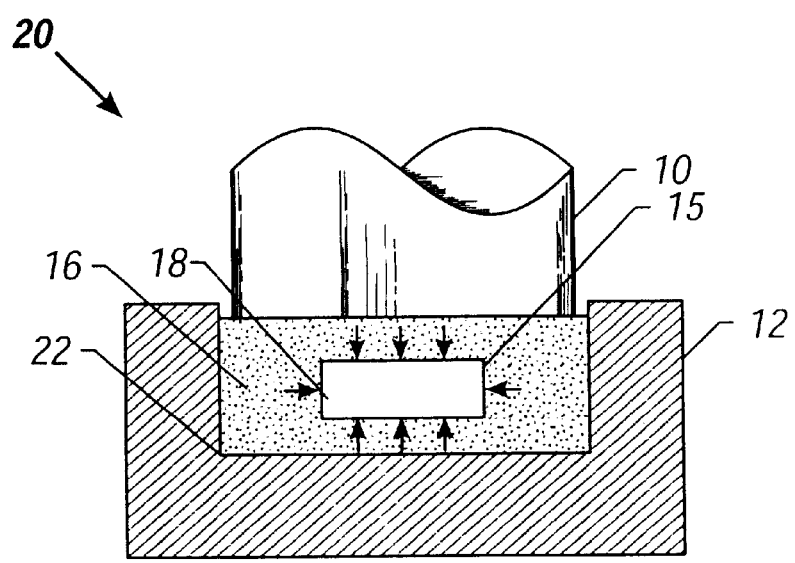
FIG. 1b shows a schematic of a typical rapid omni-directional compaction process before compaction.

FIG. 1 illustrates a typical rapid omni-directional compaction apparatus that is used in some embodiments. A forging press 20 commonly is employed in a rapid omnidirectional compaction process. It includes a ram 10, a pot die 12, and a fluid die 22. There is a close fit between the ram 10 and the fluid die 22. Inside the fluid die 22 there is a pressure-transmitting medium 16. The pressure-transmitting medium may be made from various materials that melt at a lower temperature than the temperatures used during compaction. In some embodiments, the pre-pressed diamond/metal powder mixture 14 is surrounded by a non-reactive insulation layer 15 to prevent contact between the molten medium 16 and the powder mixture 14.

As the ram 10 travels downward, the powder mixture 14 is pressed from all directions, resulting in a metal-matrix/diamond composite 18. Complete consolidation in the interparticle bonding is accomplished, without pressure dwell, in a single ram stroke that produces pressures in the range of approximately 345 to 895 MPa (50 to 130 ksi). A typical consolidation temperature is between about 800° C. and 1500° C., although other temperature ranges also are acceptable. In a preferred embodiment, the diamond/metal powder mixture is compressed to 120 ksi at 1200° C. for about two minutes.

In addition to the rapid omni-directional compaction process, the HPHT process for sintering diamond or cubic boron nitride may be used. Such a process has been described in U.S. Pat. No. 5,676,496 and U.S. Pat. No. 5,598,621 and their teachings are incorporated by reference herein. Another suitable method for hotcompacting pre-pressed diamond/metal powder mixtures is hot isostatic pressing, which is known in the art. See Peter E. Price and Steven P. Kohler, "Hot Isostatic Pressing of Metal Powders", Metals Handbook, Vol. 7, pp. 419–443 (9th ed. 1984).

Figure 2:
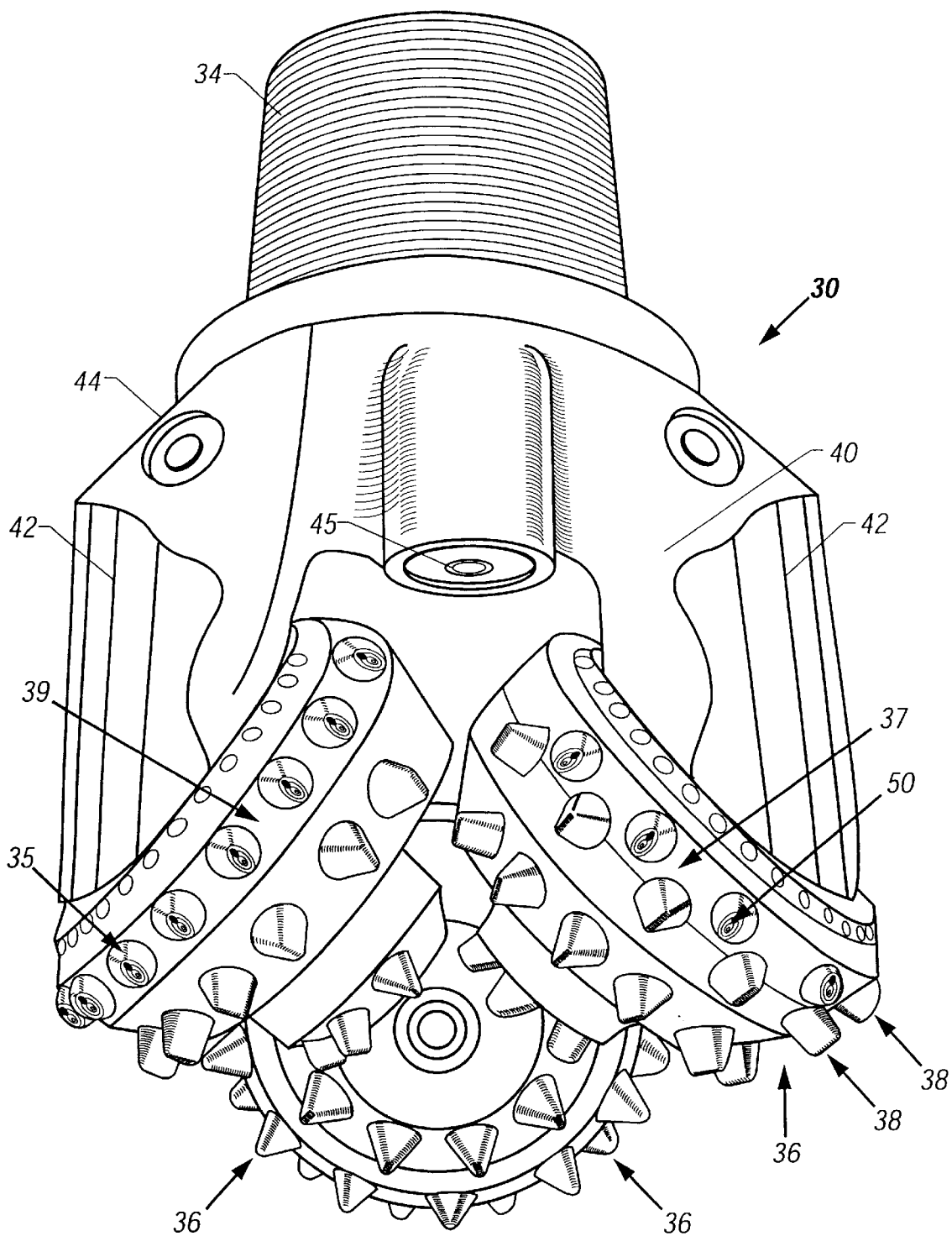
FIG. 2 is a rock bit manufactured in accordance with an embodiment of the invention.

The metal-matrix diamond or cubic boron nitride composites made in accordance with embodiments of the invention may be used as blanks for cutting tools, drill bits, dressing tools, and wear parts. Further, the metal-matrix diamond or cubic boron nitride composites that are made in a cylindrical configuration may also be used to make wire drawing dies. An example of a rock bit for downhole drilling constructed in accordance with embodiments of the invention is illustrated in FIG. 2. An rock bit 30 includes a bit body 40 with a threaded section 34 on its upper end for securing the bit to a drill string (not shown). The bit 30 generally has three roller cones 36 rotatably mounted on bearing shafts (hidden) that depend from the bit body 40. The bit body 40 comprises three sections or legs 42 (two legs are shown) that are welded together to form the bit body 40. The bit 30 further includes a plurality of nozzles 45 that are provided for directing drilling fluid toward the bottom of a borehole and around the roller cones 36. In addition, the bit 30 also may include lubricant reservoirs 44 that supply lubricant to the bearings of each of the roller cones.

Generally, each roller cone 36 includes a frustoconical surface 37 that is adapted to retain inserts that scrape or ream the sidewalls of a borehole as the roller cones 36 rotate about the borehole bottom. The frustoconical surface 37 will be referred to herein as the "heel" surface of the roller cones 36, although the same surface may be sometimes referred to in the art as the "gage" surface of the roller cone.

The roller cone 36 includes a plurality of heel row inserts 50 that are secured in a circumferential row in the frustoconical heel surface 37. The roller cone 36 further includes a circumferential row of gage inserts 35 secured in locations along or near the circumferential shoulder 39. Also, the roller cone 36 includes a plurality of inner row inserts 38 that are secured to the roller cone surface and arranged in respective rows. Although various geometric shapes of the inserts are acceptable, it is preferred that they have a semi-round top, a conical top, or a chiseled top.

The inserts include generally cylindrical base portions that are secured by an interference fit into mating sockets drilled into the lands of the cone cutter and cutting portions that are connected to the base portions. The cutting portion includes a cutting surface that extends from the surface of the roller cone for cutting or crushing the rock formation being drilled.

In accordance with embodiments of the invention, the metal-matrix/diamond or metal-matrix/CBN composites may be manufactured in the form of inserts for use in rock bits. Rock bits incorporating inserts made of these composites have a longer bit life and a higher rate of penetration. Preferably, the composites are used for making gage row inserts and heel row inserts, although it is conceivable that they also may be used to make inner row inserts. In addition to forming an insert, the composites also may be used to replace the diamond layer in diamond-enhanced inserts. Examples of such diamond-enhanced inserts are described in U.S. Pat. No. 4,006,788 and U.S. Pat. No. 4,972,912, and the teachings of these patents are incorporated by reference herein.

As described above, embodiments of the invention provide a metal-matrix/diamond or metal-matrix/CBN composite that is tougher than polycrystalline diamond or CBN compacts manufactured by the high pressure/high temperature sintering process. The metal-matrix/diamond or metal-matrix/CBN composite has a very fine microstructure in which grains of diamond or CBN generally are uniformly distributed in a metal matrix. Such a fine microstructure results in a higher fracture toughness than conventional polycrystalline diamond or CBN compacts. In addition, the hot-compaction process may be carried out at a lower pressure than the traditional HPHT sintering process, thereby reducing production costs. Moreover, it is possible to manufacture parts made of the metal-matrix/diamond or metal-matrix/CBN composite having dimensions larger than those currently available using the traditional HPHT sintering process.

While the invention has been disclosed with respect to a limited number of embodiments, numerous modifications and variations therefrom are possible. For example, suitable super-hard grains are not limited to diamond, CBN, and mixtures thereof. Other super-hard materials, such as ceramics, cements, nitrides, and carbides, also may be used. Particles of diamond-like carbon also may be used. With respect to suitable metals for the metal matrix, any suitable metal or alloys may be used. It is intended that the appended claims cover all such modifications and variations as fall within the true spirit and scope of the invention.

While the invention has been disclosed with reference to specific examples of embodiments, numerous variations and modifications are possible. Therefore, it is intended that the invention not be limited by the description in the specification, but rather the claims that follow.

What is claimed is:

1. A method for manufacturing a super-hard composite material comprising:

milling a super-hard component representing about 40%–85% of the volume of the super-hard composite material with a metal matrix component representing greater than 20% to about 60% of the volume of the super-hard composite material to achieve a uniform mixture; and compacting the uniform mixture to an actual density at least of 95% of the theoretical maximum density of the mixture, wherein the metal matrix component is selected from the group of nickel, iron, cobalt, molybdenum, tungsten, niobium, tantalum, vanadium, and alloys thereof.

2. The method of claim 1 wherein the super-hard component comprises cubic boron nitride.

3. The method of claim 1 wherein the super-hard component comprises diamond.

4. The method of claim 3 wherein the diamond is natural.

5. The method of claim 3 wherein the diamond is synthetic.

6. A method for manufacturing a super-hard composite material comprising:
   milling a diamond component representing about 40%–85% of the volume of the super-hard composite material with a metal matrix component representing about 15%–60% of the volume of the super-hard composite material to achieve a uniform mixture;
   compacting the uniform mixture to an actual density at least of 95% of the theoretical maximum density of the mixture; and
   heat treating the diamond component in a hydrogen atmosphere.

7. The method of claim 1 wherein the size of grains of the super-hard component is between 1 $\mu$m and 30 $\mu$m.

8. A method for manufacturing a super-hard composite material comprising:
   milling a super-hard component representing about 40%–85% of the volume of the super-hard composite material with a metal matrix component representing about 15%–60% of the volume of the super-hard composite material to achieve a uniform mixture;
   compacting the uniform mixture to an actual density at least of 95% of the theoretical maximum density of the mixture; and
   coating the grains of the super-hard component with a layer of metal prior to the milling to reduce oxidation of the super-hard component.

9. The method of claim 8 wherein the metal in the metal layer is selected from the group of copper, titanium nitride, titanium carbonitride, zirconium nitride, cobalt, tungsten, and nickel.

10. The method of claim 1 wherein the size of grains of the metal matrix component is between 1 $\mu$m and 30 $\mu$m.

11. The method of claim 1 wherein the compacting the uniform composite mixture comprises cold compacting.

12. The method of claim 1 wherein the compacting the uniform composite mixture comprises hot compacting.

13. The method of claim 12 wherein hot compacting is performed by a process selected from hot isostatic pressing, hot pressing, rapid omni-directional compaction, and high temperature/high pressure compaction.

14. A method for manufacturing a super-hard composite material comprising:
   milling a super-hard component representing about 40% to less than 75% of the volume of the super-hard composite material with a metal matrix component representing about 15%–60% of the volume of the super-hard composite material to achieve a uniform mixture; and
   compacting the uniform mixture to an actual density at least of 95% of the theoretical maximum density of the mixture, wherein the metal matrix component is selected from the group of nickel, iron, cobalt, molybdenum, tungsten, niobium, tantalum, vanadium, and alloys thereof.

15. The method of claim 14, wherein the super-hard component comprises cubic boron nitride.

16. The method of claim 14, wherein the super-hard component comprises diamond.

17. The method of claim 16, wherein the diamond is natural.

18. The method of claim 16, wherein the diamond is synthetic.

19. The method of claim 13, wherein the size of grains of the super-hard component is between 1 $\mu$m and 30 $\mu$m.

20. The method of claim 14, wherein the size of grains of the matrix metal component is between 1 $\mu$m and 30 $\mu$m.

21. The method of claim 14, wherein the compacting the uniform composite mixture comprises cold compacting.

22. The method of claim 14, wherein the compacting the uniform composite mixture comprises hot compacting.

23. The method of claim 22, wherein hot compacting is performed by a process selected from hot isostatic pressing, hot pressing, rapid omni-directional compaction, and high temperature/high pressure compaction.

* * * * *